(12) United States Patent
Sekaran et al.

(10) Patent No.: US 8,150,917 B2
(45) Date of Patent: Apr. 3, 2012

(54) HIGH AVAILABILITY CONFERENCING

(75) Inventors: Dhigha Sekaran, Redmond, WA (US); Deepak P. Rao, Bellevue, WA (US); Sankaran Narayanan, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 925 days.

(21) Appl. No.: 11/534,411

(22) Filed: Sep. 22, 2006

(65) Prior Publication Data

US 2008/0077665 A1 Mar. 27, 2008

(51) Int. Cl.
G06F 15/16 (2006.01)
(52) U.S. Cl. .................................. 709/204; 709/219
(58) Field of Classification Search ........... 709/203–207
See application file for complete search history.

(56) References Cited

U.S. PATENT DOCUMENTS

| | | | |
|---|---|---|---|
| 5,710,591 A | 1/1998 | Bruno et al. | |
| 5,838,664 A | 11/1998 | Polomski | |
| 5,841,763 A | 11/1998 | Leondires et al. | |
| 6,020,915 A | 2/2000 | Bruno et al. | |
| 6,081,513 A | 6/2000 | Roy | |
| 6,404,745 B1 | 6/2002 | O'Neil et al. | |
| 6,584,077 B1 | 6/2003 | Polomski | |
| 6,606,306 B1 | 8/2003 | Lin et al. | |
| 6,879,565 B2 | 4/2005 | Baxley et al. | |
| 7,054,933 B2 | 5/2006 | Baxley et al. | |
| 2001/0019354 A1 | 9/2001 | Einarsson et al. | |
| 2001/0054070 A1 | 12/2001 | Savage, III et al. | |
| 2002/0066109 A1 | 5/2002 | Tam et al. | |
| 2003/0021400 A1 | 1/2003 | Grandgent et al. | |
| 2003/0108000 A1 | 6/2003 | Chaney et al. | |
| 2003/0147357 A1 | 8/2003 | Zhang et al. | |
| 2003/0153340 A1* | 8/2003 | Crockett et al. | 455/518 |
| 2003/0167303 A1 | 9/2003 | Zhu et al. | |
| 2004/0246332 A1 | 12/2004 | Crouch | |
| 2005/0007446 A1 | 1/2005 | Schrader et al. | |
| 2005/0012812 A1 | 1/2005 | Seo | |
| 2005/0198209 A1 | 9/2005 | Barrett | |

(Continued)

FOREIGN PATENT DOCUMENTS

EP 0889629 1/1999

OTHER PUBLICATIONS

Ahuja, S.R., J. Robert Ensor and David N. Horn, "The Rapport Multimedia Conferencing System," © 1988 ACM, pp. 1-8.

(Continued)

*Primary Examiner* — Ian N Moore
*Assistant Examiner* — Afshawn Towfighi
(74) *Attorney, Agent, or Firm* — Perkins Coie LLP

(57) ABSTRACT

A method, system, and architecture for providing a conference system that effectively achieves high availability conferencing is provided. The conference system architecture provides a conference system that comprises a set of stateless conference servers and a shared conference store to provide highly available conferencing to its users. The conference servers serve (host) conferences (meetings) that allow users to conduct distributed conferences. Each conference server generally performs conference provisioning operations and conference control operations. The shared conference store provides for the storage of conference state information, thus allowing the conference servers in the conference server pool to be stateless by maintaining conference state information on the shared conference store. A stateless conference server may also locally maintain, for example, in cache memory, some of the conference state information that is maintained on the shared conference store.

13 Claims, 8 Drawing Sheets

U.S. PATENT DOCUMENTS

| | | | |
|---|---|---|---|
| 2005/0213739 | A1 | 9/2005 | Rodman et al. |
| 2006/0031290 | A1 | 2/2006 | Mannaru et al. |
| 2006/0132301 | A1 | 6/2006 | Stilp |
| 2006/0233120 | A1 | 10/2006 | Eshel et al. |
| 2007/0217589 | A1* | 9/2007 | Martin et al. ............ 379/202.01 |
| 2008/0077666 | A1 | 3/2008 | Sekaran et al. |

OTHER PUBLICATIONS

Boyer, David G. And Michael E. Lukacs, "The Personal Presence System—A Wide Area Network Resource for the Real Time Composition of Multipoint Multimedia Communications," Multimedia'94, San Francisco, California, © 1994 ACM, pp. 453-460.

U.S. Appl. No. 11/552,905, Sekaran et al.

Cho, Yeong-Hun et al., "Distributed Management Architecture for Multimedia Conferencing Using SIP," Proceedings of the First International Conference on Distributed Frameworks for Multimedia Applications, 2005, IEEE, pp. 1-8.

Lago, Patricia and Gianni Canal, "A Video-conferencing Distributed Service Tailored for Education," 1999 IEEE International Conference on Multimedia Computing and Systems (ICMCS'99), vol. 2, p. 1038.

Sun, Ming-Ting, Tzong-Der Wu and Jenq-Neng Hwang, "Dynamic Bit Allocation in Video Combining for Multipoint Conferencing," IEEE Transactions on Circuits and Systems II, Analog and Digital Signal Processing, vol. 45, No. 5, May 1998, © 1998 IEEE, pp. 644-648.

* cited by examiner

HIGH AVAILABILITY CONFERENCING

BACKGROUND

With the proliferation of computers and the advent of the Internet, and in particular, the maturing of the World Wide Web ("web"), real-time conversations between conversation participants via their computer systems are becoming increasingly common. These conversations, which take place virtually over computer networks, are ever replacing the traditional face-to-face meetings.

Collaboration systems are increasingly being used to conduct these virtual meetings between potentially geographically distributed people. These collaboration systems typically employ multiple servers to provide users the collaboration services. In a typical scenario, a meeting organizer schedules a virtual meeting (a collaboration session) with a collaboration server, and provides a list of people who are expected to participate in the scheduled virtual meeting. The meeting organizer then sends each of the expected participants an invitation inviting the participant to attend the virtual meeting at the scheduled time. At or just prior to the scheduled time, an invited participant can use his or her client computing device, such as laptop computer or handheld device, to establish a network connection to one of the collaboration servers in order to participate in the scheduled virtual meeting.

When a meeting participant at a client device connects to a collaboration server, the collaboration server maintains all of the information regarding the meeting participant and the requested virtual meeting, including information regarding the client device and the collaboration session that is established between the client device and the collaboration server. In current collaboration systems, the collaboration server maintains all of this conferencing information locally, for example, on its local storage device. One problem occurs when the collaboration server to which the client device is connected to becomes unavailable. For example, the collaboration server may become unavailable due to a failure in the connection between the client device and the collaboration server, due to the collaboration server "crashing," due to the collaboration server being taken "offline," and the like. When the meeting participant subsequently tires to reconnect to the virtual meeting, the participant's client device will likely connect to a different collaboration server (i.e., a collaboration server other than the collaboration server to which the client device was previously connected). Since the previously connected collaboration server locally maintained all of the information regarding the meeting participant and the requested virtual meeting, this information is no longer available to the newly connected collaboration server. Thus, the meeting participant will again have to provide his or her authentication information along with the necessary information pertaining to the virtual meeting to the newly connected collaboration server. This results in an unnecessary, additional delay in reconnecting the meeting participant to the virtual meeting. Moreover, the newly connected collaboration server will not be able to recreate the exact virtual meeting environment or state (i.e., the state of the virtual meeting the meeting participant was in just prior to the previously connected collaboration server becoming unavailable) for the meeting participant. This results in an additional drop-off in the level of end user experience with current collaboration systems.

One common solution for maintaining the level of end user experience is to maintain redundant servers. For example, each collaboration server will locally maintain the conference information as well as maintain a "hard replica" of the conference information on a redundant collaboration server. This way, if the collaboration server becomes unavailable for whatever reason, its redundant server can continue processing the collaboration session previously provided by the no longer available collaboration server. One major problem with this solution is the increased costs associated with providing the redundant servers.

SUMMARY

A method, system, and architecture for providing a conference system that effectively achieves high availability conferencing is provided. The conference system architecture provides a conference system that comprises a set of stateless conference servers and a shared conference store to provide highly available conferencing to its users. The conference servers serve (host) conferences (meetings) that allow users to conduct distributed conferences. Each conference server generally performs conference provisioning operations and conference control operations. The shared conference store provides for the storage of conference state information, thus allowing the conference servers in the conference server pool to be stateless by maintaining conference state information on the shared conference store. A stateless conference server may also locally maintain, for example, in cache memory, some of the conference state information that is maintained on the shared conference store.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
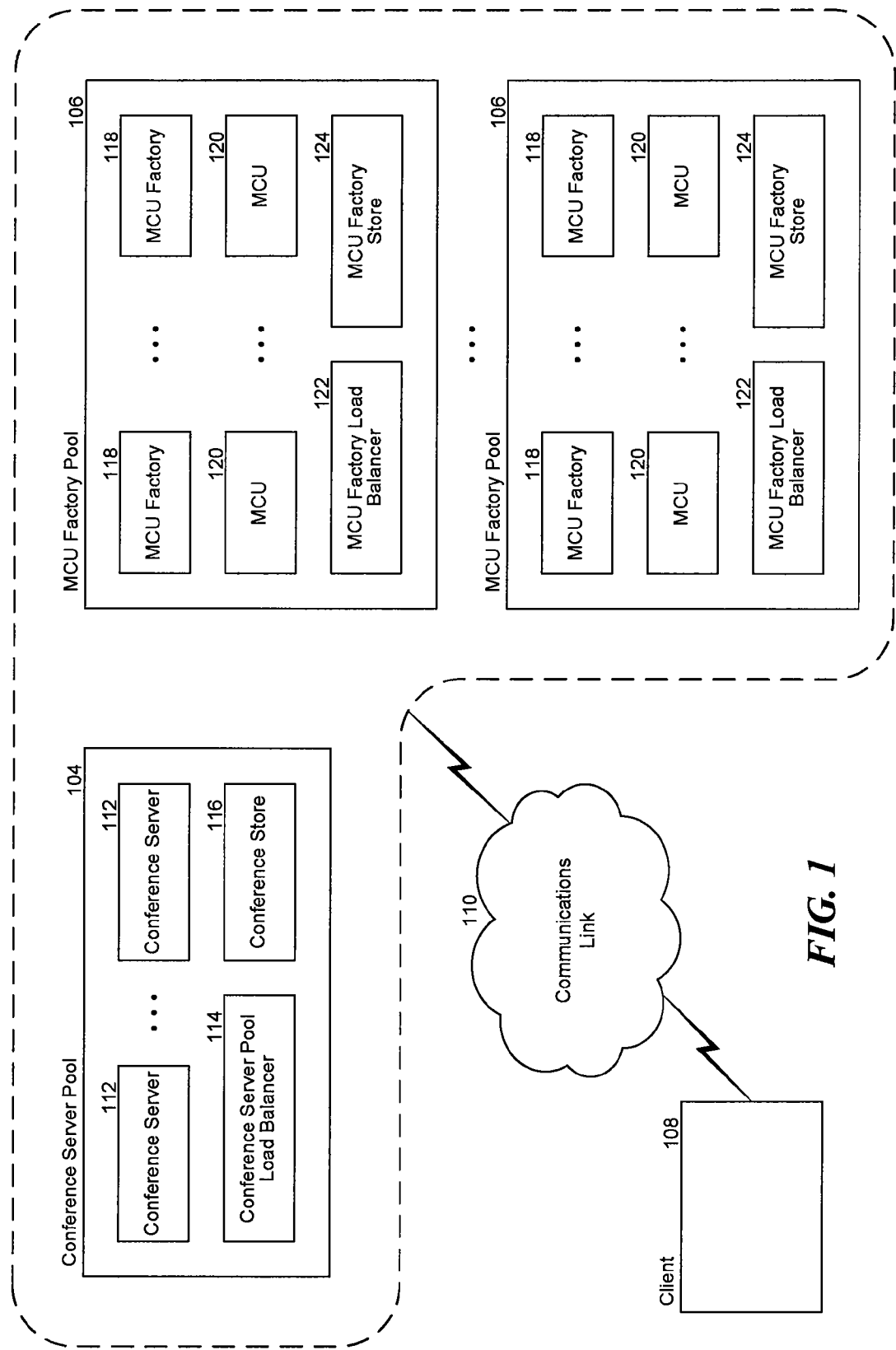
FIG. 1 is a block diagram that illustrates the architecture of a conference system, according to some embodiments.

A method, system, and architecture for providing a conference system that effectively achieves high availability conferencing is provided. In some embodiments, the conference system architecture provides a conference system that comprises a set of stateless conference servers and a shared conference store to provide highly available conferencing to its users. The conference servers serve (host) conferences (meetings) that allow users to conduct distributed conferences that may include text, audio, and video content. Each conference server generally performs conference provisioning operations and conference control operations. The shared conference store provides for the storage of conference state information, thus allowing the conference servers in the conference server pool to be stateless. The set of stateless conference servers and the shared conference store may be provided in a conference server pool, and the conference server pool may provide an interface through which users can access and interact with the conference servers to utilize the provided conferencing services. For example, when the conference server pool receives a request from a user to create (schedule) a conference, the conference server pool allocates a conference server to service the user and directs the user's computer (e.g., a client process (interchangeably referred to herein as a client) executing on the user's computer) to connect to and communicate with the allocated conference server to create a conference. In serving the request to create the conference, the allocated conference server maintains the static conference state information, such as, by way of example, the scheduled time of the conference, the list of participants in the conference, the requested media resources, etc., on the shared conference store. When the conference server pool receives a request from a user to join a conference, the conference server pool allocates a conference server to service the user and directs the client to connect to and communicate with the allocated conference server to join and participate in the conference. Any of the conference servers in the conference server pool may be allocated to service the user's request to join and participate in the conference because the conference state information is maintained (stored) on the shared conference store. While serving the conference, the allocated conference server maintains the dynamic conference state information, such as, by way of example, the clients that have joined the conference, the participant that is currently presenting, etc., on the shared conference store. Subsequently, if the conference server pool receives a request from the same user to reconnect to (rejoin) the same conference, the conference server pool can allocate the same or different conference server to service the user and can direct the client to connect to and communicate with the allocated conference server to reconnect to and participate in the conference. For example, the client may need to rejoin the conference because the connection between the client and the preciously allocated conference server may have been lost. Although the newly allocated conference server may be different from the conference server that previously serviced the client, the newly allocated conference server is able to rejoin the user to the conference with minimal impact because the conference state information is maintained on the shared conference store. As such, each conference server in the conference server pool is identical in that a client can send a conference operation to any conference server serving the conference. In this manner, the conference system, by providing stateless conference servers that maintain conference state information on the shared conference store, can provide users highly available conferencing services.

In some embodiments, a conference server that is serving a conference may also maintain some of the conference state information that is maintained on the shared conference store locally on the conference server, for example, in cache memory. The conference server may then periodically synchronize the locally maintained conference state information with the conference state information maintained on the shared conference store. By locally maintaining the conference state information, the conference server is able to reduce the number of it needs to access the shared conference store, for example, to retrieve the conference state information. In some embodiments, the shared conference store may provide additional redundancy. For example, the shared conference store may copy the conference state information onto a redundant shared conference store, and periodically synchronize the copy of the conference state information on the shared conference store and the redundant shared conference store. In this manner, if the shared conference store happens to become inaccessible for some reason, the conference servers can still access the conference state information maintained on the redundant shared conference store.

In some embodiments, the conference system provides a conference server pool load balancer that assigns work loads to the conference servers in the conference server pool to increase the capacity of the conference server pool. When the conference server pool receives a request, the conference server pool load balancer can allocate a conference server to service the received request based on the current workload of each of the conference servers. For example, the request may be a request from a user to join a conference, and the conference server pool load balancer can allocate the conference server having the lightest workload to service the request. By allocating the conference servers based on the corresponding workloads of the conference servers, the conference server pool load balancer is able to increase the capacity of the conference server pool.

In some embodiments, the conference system uses multipoint control units (MCUs) to provide the conferencing modalities (shared conference resource) such as audio, video, chat, text messaging, application sharing, etc. For example, an audio MCU may provide the audio functionality in a conference. Similarly, a video MCU may provide the video functionality in a conference, an application sharing MCU may provide the application sharing functionality in a conference, a text messaging MCU may provide the text messaging functionality in a conference, and so on. Depending on the functionality provided by an MCU, the MCU may be considered a process that is executing on a computer system. The set of MCUs may be provided in an MCU factory pool, which also comprises one or more MCU factories and an MCU factory store. An MCU factory manages (e.g., monitors, allocates to conference servers, etc.) one or more MCUs that are assigned to the particular MCU factory. The MCU factories maintain the state information regarding their assigned (managed) MCUs, such as the health status of the MCU, the current load placed on the MCU, etc., in the MCU factory store. The MCU factory pool provides an interface through which an MCU can request assignment to an MCU factory in the MCU factory pool in order to make available the conferencing modality provided by the MCU to the conference servers. For example, when the MCU factory pool receives a request from an MCU to be assigned to an MCU factory, the conference server pool assigns the MCU to one of the MCU factories in the MCU factory pool. Alternatively, an MCU factory may have prior knowledge of the MCUs that are assigned to the MCU factory. The MCU factory to which the MCU is assigned can then monitor the status of the assigned MCU and allocate the conferencing modality provided by the assigned MCU to the conference servers. Subsequently, when the MCU factory pool receives a request from a conference server for an MCU factory to support a conference hosted on the conference server, the MCU factory pool allocates an MCU factory to service the conference server and, in particular, the conference hosted by the conference server, and directs the conference server to connect to and communicate with the allocated MCU factory pool in order to provide the necessary conferencing modalities. When the conference server needs to provide a specific conferencing modality in the conference, the conference server can request that the allocated MCU factory allocate an assigned MCU that is capable of providing the specific conferencing modality to the conference server. The MCU factory can allocate the assigned MCUs based on the state information of the MCUs maintained on the MCU factory store. For example, the MCU factory can use the state information of the MCUs maintained on the MCU factory store to allocate its assigned MCUs in a manner as to distribute the work load assigned to the MCUs. The conference server can then direct the clients (users) participating in the conference to connect to and communicate with the allocated MCU in order to participate in the conferencing modality provided by the MCU. While serving (hosting) the conference, the allocated MCU sends conference state information, including user state change information (e.g., which client is presenting, which clients are on mute, etc.), to the conference server pool. When the conference server pool receives the conference state information, the conference server pool allocates a conference server to process the received conference state information. For example, the allocated conference server can process the conference state information by storing it in the shared conference store. Any of the conference servers in the conference server pool may be allocated to process the received conference state information because the conference state information is maintained on the shared conference store. Because the MCU sends the conference state information to the conference server pool, and the conference state information is maintained on the shared conference store, the MCU is able to send the conference state information as long as one conference server is available in the conference server pool. If, during the conference, the conference server detects a failure of an allocated MCU, the conference server can request that the allocated MCU factory allocate another MCU to replace the failed MCU, and the MCU factory can quickly allocate a replacement MCU. The conference server can then direct the clients to connect to the replacement MCU. The replacement MCU may need to determine the last conference state that was being provided by the failed MCU. For example, in the case of a slide presentation MCU, the replacement MCU may need to know the last slide that was being presented. The replacement MCU is able to determine the last conference state that was provided by the failed MCU from the shared conference store. In this manner, the conference system, by providing MCUs that facilitate conferencing modalities, is further able to provide users highly available conferencing services because a failure of any one MCU allocated to a conference does not affect the other aspects of the conference. Moreover, the additional layer of indirection provided by the MCU factories allows any failed MCU in a conference to be quickly replaced by another MCU, thus subjecting the users in the conference to minimal impact.

In some embodiments, an MCU factory may manage a single type of MCU. For example, the MCU factory pool may contain multiple MCU factories that manage video MCUs, multiple MCU factories that manage audio MCUs, multiple MCU factories that manage text messaging MCUs, and the like. For example, when the MCU factory pool receives a request from an audio MCU to be assigned to an MCU factory, the conference server pool assigns the audio MCU to one of the MCU factories in the MCU factory pool that manages audio MCUs. Similarly, when the MCU factory pool receives a request from a video MCU to be assigned to an MCU factory, the conference server pool assigns the video MCU to one of the MCU factories in the MCU factory pool that manages video MCUs. In some embodiments, an MCU factory may manage one or more types of MCUs. For example, the MCU factory pool may contain multiple MCU factories, where each MCU factory is capable of managing one or more MCUs irrespective of the type of MCU.

In some embodiments, the MCU factories, the MCUs, and the MCU factory store may be contained in a single MCU factory pool. In some embodiments, the MCU factories and the MCUs may be contained in multiple MCU factories pools. For example, the video MCUs and the MCU factories that manage the video MCUs may be contained in one MCU factory pool, the audio MCUs and the MCU factories that manage the audio MCUs may be contained in another MCU factory pool, the application sharing MCUs and the MCU factories that manage the application sharing MCUs may be contained in still another MCU factory pool. Each of the MCU factory pools may also comprise an MCU factory store.

In some embodiments, the conference system provides an MCU factory load balancer that assigns work loads to the MCU factories in the MCU factory pool to increase the capacity of the MCU factory pool. When the MCU factory pool receives a request from a conference server for an MCU factory to support a conference hosted on the conference server, the MCU factory load balancer can allocate an MCU factory to service the conference server based on the current workload of each MCU factory. For example, the MCU factory load balancer can allocate the MCU factory having the lightest workload to service the conference server. By allocating the MCU factories based on the corresponding workloads of the MCU factories, the MCU factory load balancer is able to increase the capacity of the MCU factory pool.

In some embodiments, the conference system allows for the scale out of the conference servers contained in the conference server pool in order to increase the processing capacity of the conference server pool. For example, an administrator, or other authorized user, of the conference system may determine that the conference system is executing at or near full capacity. The administrator can simply add additional conference servers in the conference server pool to increase the capacity of the conference system. The conference server pool is able to distribute processing load on the newly added conference server because the conference servers are stateless and the conference state information is maintained on the shared conference store. Similarly, the administrator may also add additional MCUs to the MCU factory pool in order to increase the processing capability of the MCU factory pool. In some embodiments, the conference system may monitor the processing load and automatically add conference servers to the conference server pool and/or MCUs to the MCU factory pool to increase the provided capacity. In this way, the conference system is able to easily increase its processing capability to further provide users highly available conferencing services.

FIG. 1 is a block diagram that illustrates the architecture of a conference system, according to some embodiments. A conference system 102 comprises a conference server pool 104 and a plurality of MCU factory pools 106. The conference system users can use a client 108 to access the conference system via a communications link 110. The client may be a conference system client application (or other application suitable for communicating with and accessing the conference system) that executes on the user's computer or any computing device. The conference server pool comprises a plurality of conference servers 112, a conference server pool load balancer 114, and a conference store 116. The conference servers allow connected clients to perform conferencing. The conference servers are stateless in that conference state information is maintained on the shared conference store. The conference server pool load balancer distributes the work load among the conference servers. The conference store is a shared data store that includes the conference state information that is necessary to provide the conferencing services. The conference store allows the conference servers to maintain the conference state information apart from the conference servers, thus enabling the conference servers to be stateless. The conference store may be implemented using a structured query language (SQL) database backend or some form of distributed shared memory which provides high availability to the conference servers. Each MCU factory pool comprises a plurality of MCU factories 118, a plurality of MCUs 120, an MCU factory load balancer 122, and an MCU factory store 124. Each MCU provides a conferencing modality, and is assigned to an MCU factory. Each MCU factory manages its assigned MCUs by monitoring the state of its assigned MCUs and allocating its assigned MCUs to the conferences hosted by the conference system. For example, each MCU may periodically send its state information to the MCU factory to which it is assigned, thus enabling the MCU factory to monitor the health of the MCU. Alternatively, the MCU factory may periodically query the MCUs to determine their availability. The MCU factory store is a shared data store that includes the information regarding the MCU factories and the MCUs. For example, the MCU factory may maintain the state information for its assigned MCUs on the MCU factory store. The MCU factory load balancer distributes the work load among the MCU factories. One skilled in the art will appreciate that an MCU factory pool is a designation for a grouping of one or more MCUs, one or more MCU factories that manage the one or more MCUs, an MCU factory load balancer, and an MCU factory store. As such, the conference system may comprise a different number of MCU factory pools. For example, the conference system may comprise a single MCU factory pool that includes all of the MCUs and MCU factories. As another example, the conference system may comprise separate MCU factory pools for each type conferencing modality. As still another example, the conference system may comprise a plurality of MCU factory pools, where each MCU factory pool includes a combination of MCUs and MCU factories. Moreover, the MCU factory load balancer is optional, and may not be provided in one or more MCU factory pools. Similarly, the conference server pool load balancer is optional and may not be provided in the conference server pool.

In the architecture in FIG. 1, the client may not have the functionality to connect to the conference system and, in particular, the conference server pool to participate in a conference. These clients may participate in the conference by, for example, connecting to another entity that communicates with an MCU that is allocated for the conference. By way of example, a user may be at an airport with access to only a simple phone. To participate in the conference, the user might dial in to a toll-free number and punch in a number that identifies the conference. The phone system can then look-up the phone MCU for that conference by, for example, querying the conference store directly, or by querying one of the conference servers, and patch the user through directly to the particular phone MCU. Subsequently, if the particular phone MCU were to go down for any reason, the application running on the phone system can determine the newly allocated phone MCU and seamlessly bridge the user over to the newly allocated phone MCU, thus allowing the user to remain in the conference. In this manner, the conference system is able to provide high availability conferencing to a client that is participating in a conference through an MCU allocated for that conference and not a conference server.

In general terms, the communications link facilitates the transfer of electronic content between, for example, the attached client and components of the conference system. In some embodiments, the communications link includes the Internet. It will be appreciated that the communications link may be comprised of one or more other types of networks, such as a local area network, a wide area network, a point-to-point dial-up connection, and the like.

Computing devices on which the conference system, including the conference servers, the conference server pool load balancer, the conference store, the MCU factories, the MCUs, the MCU factory load balancers, the MCU factory stores, and the clients may be implemented may include a central processing unit, memory, input devices (e.g., keyboard and pointing devices), output devices (e.g., display devices), and storage devices (e.g., disk drives). The memory and storage devices are computer-readable media that may contain computer executable instructions that implement the conference system or the described techniques. As used herein, "computer-readable media encoded with computer executable instructions" means computer-readable media comprising computer executable instructions. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the conference system architecture, including the described techniques may be implemented in various operating environments that include personal computers, server computers, hand-held or laptop devices, multiprocessor systems, microprocessor-based systems, programmable consumer electronics, digital cameras, network PCs, minicomputers, mainframe computers, network devices, distributed computing environments that include any of the above systems or devices, and so on. The computer systems may be cell phones, personal digital assistants, smart phones, personal computers, programmable consumer electronics, digital cameras, and so on.

The conference system architecture may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
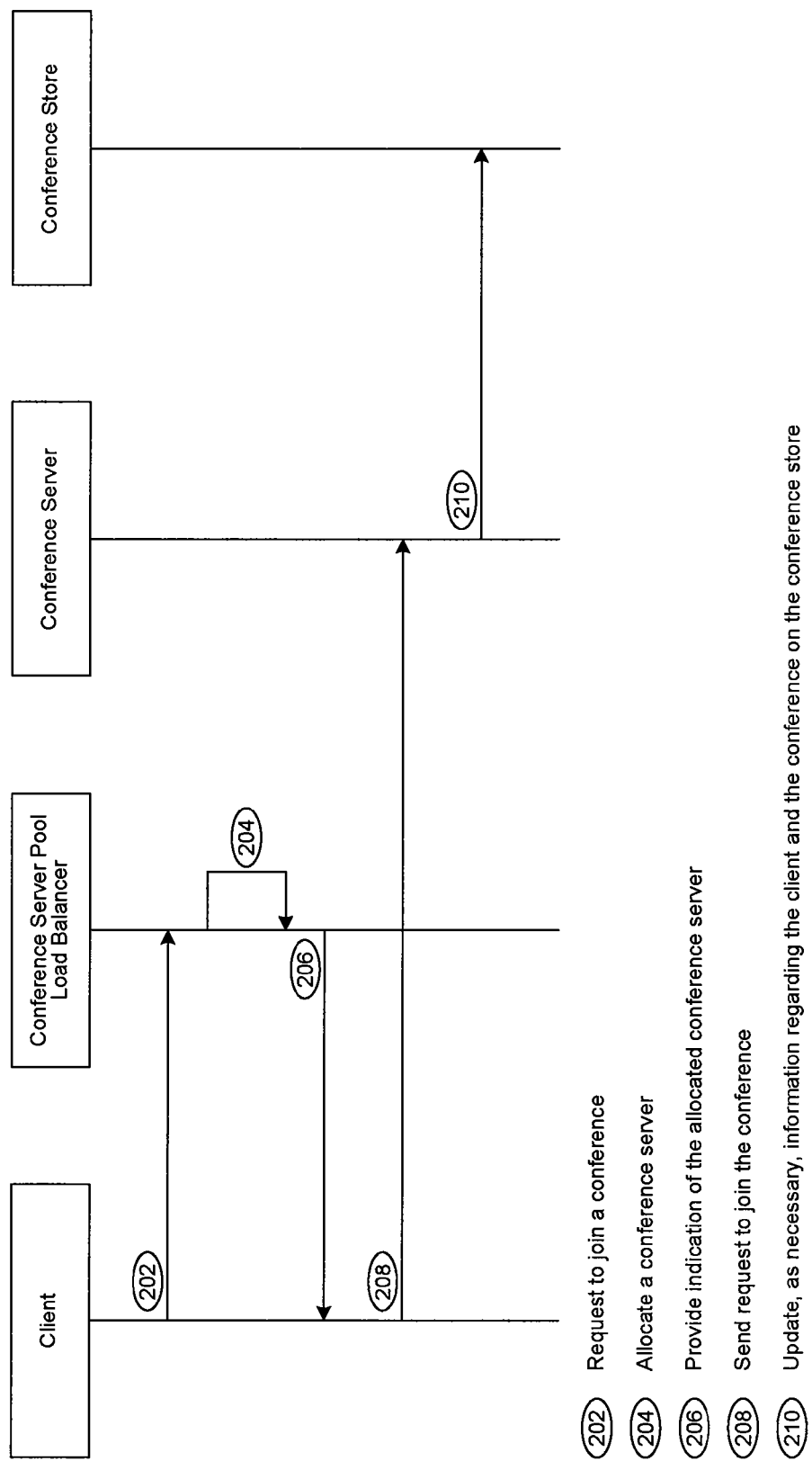
FIG. 2 is a data flow diagram that illustrates the flow of data to join a client to a conference, according to some embodiments.

FIG. 2 is a data flow diagram that illustrates the flow of data to join a client to a conference, according to some embodiments. A user at a client initiates the process of joining a conference hosted by the conference system by sending 202 a request to join the conference to the conference server pool load balancer. Upon receiving the request, the conference server pool load balancer determines 204 which conference server is best suited to process the request and allocates that conference server to process the request. In some embodiments, the conference server pool load balancer allocates the conference server that has the most capacity available. In some embodiments, the conference server pool load balancer allocates the conference server by using a round-robin technique. One skilled in the art will appreciate that many different load balancing techniques may be used to allocate the conference servers in the conference server pool. The conference server pool load balancer then provides 206 an indication of the allocated conference server to the client. The client then sends 208 a request to join the conference to the allocated conference server. Upon receiving the request, the allocated conference server joins the client to the requested conference. In some embodiments, the conference server pool load balancer can route the request to the allocated conference server. The allocated conference server can then process the routed request by, for example, joining the client to the requested conference. In this manner, the conference servers in the conference server pool may be "virtualized" and represented as one entity to the clients. The allocated conference server then updates 210, as necessary, information regarding the conference and the client on the shared conference store. For example, the allocated conference server may update state information regarding the client and the joined conference. The allocated conference server may receive information regarding the client from an MCU that is servicing (hosting) the conference (i.e., from am MCU that is providing a conferencing modality to the conference).

One skilled in the art will appreciate that, for this and other processes and methods disclosed herein, the functions/steps performed in the processes and methods may be altered in various ways. For example, the order of the outlined steps is only exemplary, and the steps may be rearranged, some of the steps may be optional, substeps may be performed in parallel, some of the steps may be combined into fewer steps or expanded into additional steps, other steps may be included, etc.

Figure 3:
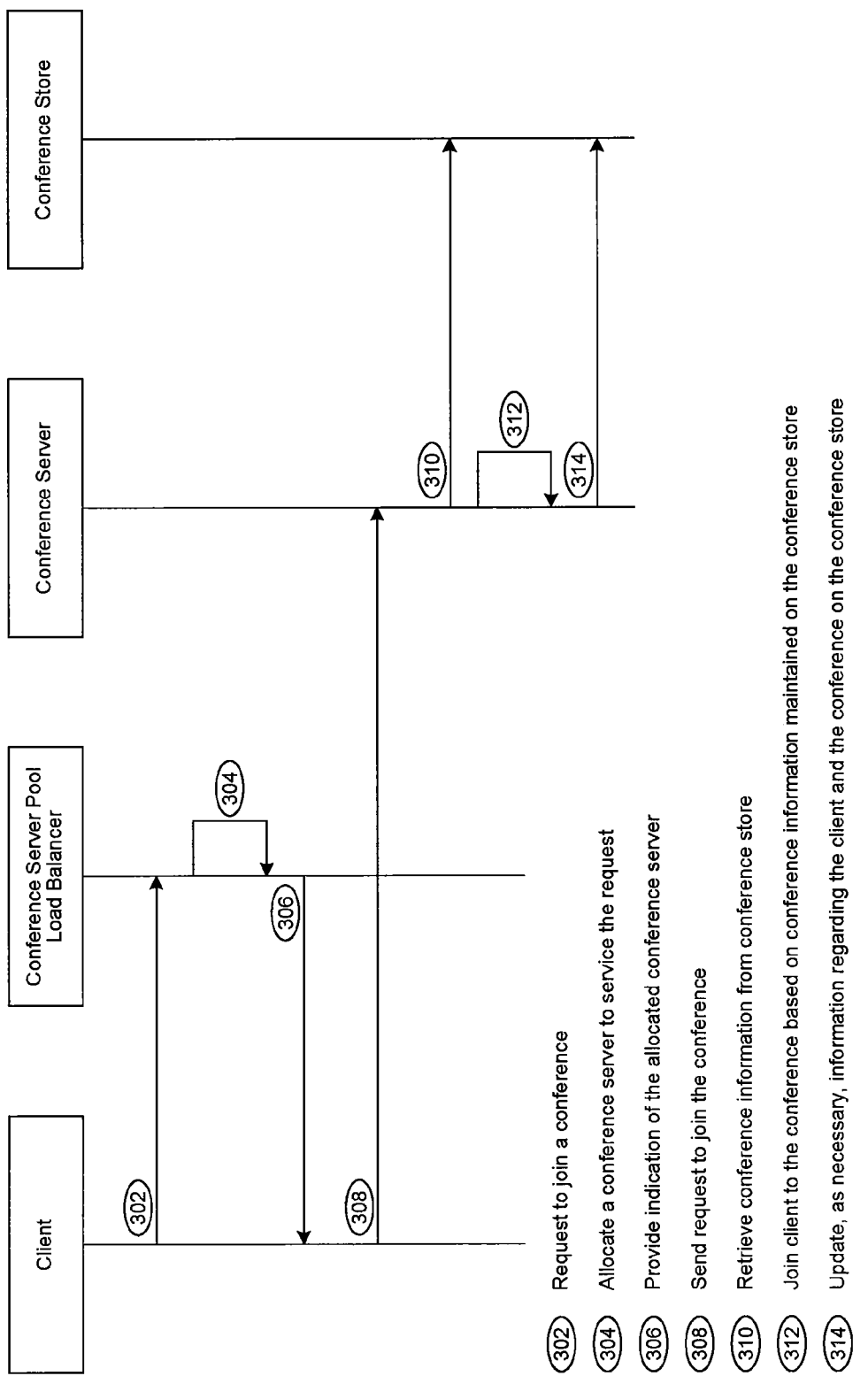
FIG. 3 is a data flow diagram that illustrates the flow of data to join a client to a conference based on existing conference information, according to some embodiments.

FIG. 3 is a data flow diagram that illustrates the flow of data to join a client to a conference based on existing conference information, according to some embodiments. By way of example, a user may have been participating in a conference and the client may have lost its connection to a conference server that was previously allocated to service the client. The user at the client may then initiate a request to join (rejoin) the conference by sending 302 a request to join the conference to the conference server pool load balancer. Upon receiving the request, the conference server pool load balancer determines 304 which conference server is best suited to process the request and allocates that conference server to process the request. The conference server pool load balancer then provides 306 an indication of the allocated conference server to the client. The client then sends 308 a request to join the conference to the newly allocated conference server. Upon receiving the request, the newly allocated conference server retrieves 310 from the shared conference store the conference state information for the requested conference (e.g., the static and dynamic state information for the requested conference). The newly allocated conference server then joins 312 the client to the requested conference based on the conference state information. The newly allocated conference server then updates 314, as necessary, information regarding the conference and the client on the shared conference store.

Figure 4:
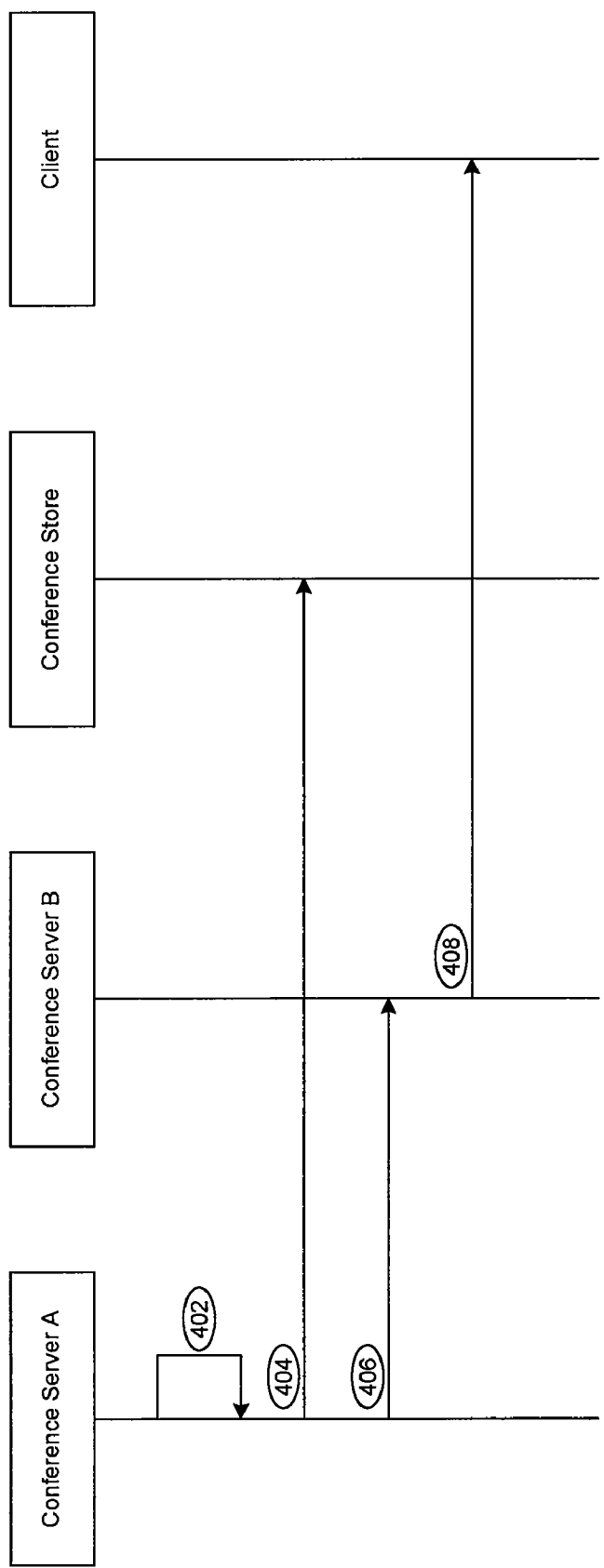
FIG. 4 is a data flow diagram that illustrates the flow of data to send a communication to a client, according to some embodiments.

FIG. 4 is a data flow diagram that illustrates the flow of data to send a communication to a client, according to some embodiments. During a conference, a conference server may determine 402 a need to send a communication (message) to a client that is participating in the conference. The message may include a conference state (e.g., User X has joined the Audio/Video conference resource). Upon determining a need to send a communication to the client, the conference server identifies 404 a conference server to which the client is connected to (i.e., the conference server that the client connected to in order to participate in the conference). The conference server may identity the conference server to which the client is connect to from the conference state information that is maintained on the shared conference store. The conference server then sends 406 to the identified conference server the communication that is to be sent to the client. Upon receiving the communication, the identified conference server sends 408 the communication to the client. In this manner, a client participating in a conference can communicate with any other client participating in the conference via the conference server pool without having to know the conference servers that are servicing the other clients.

Figure 5:
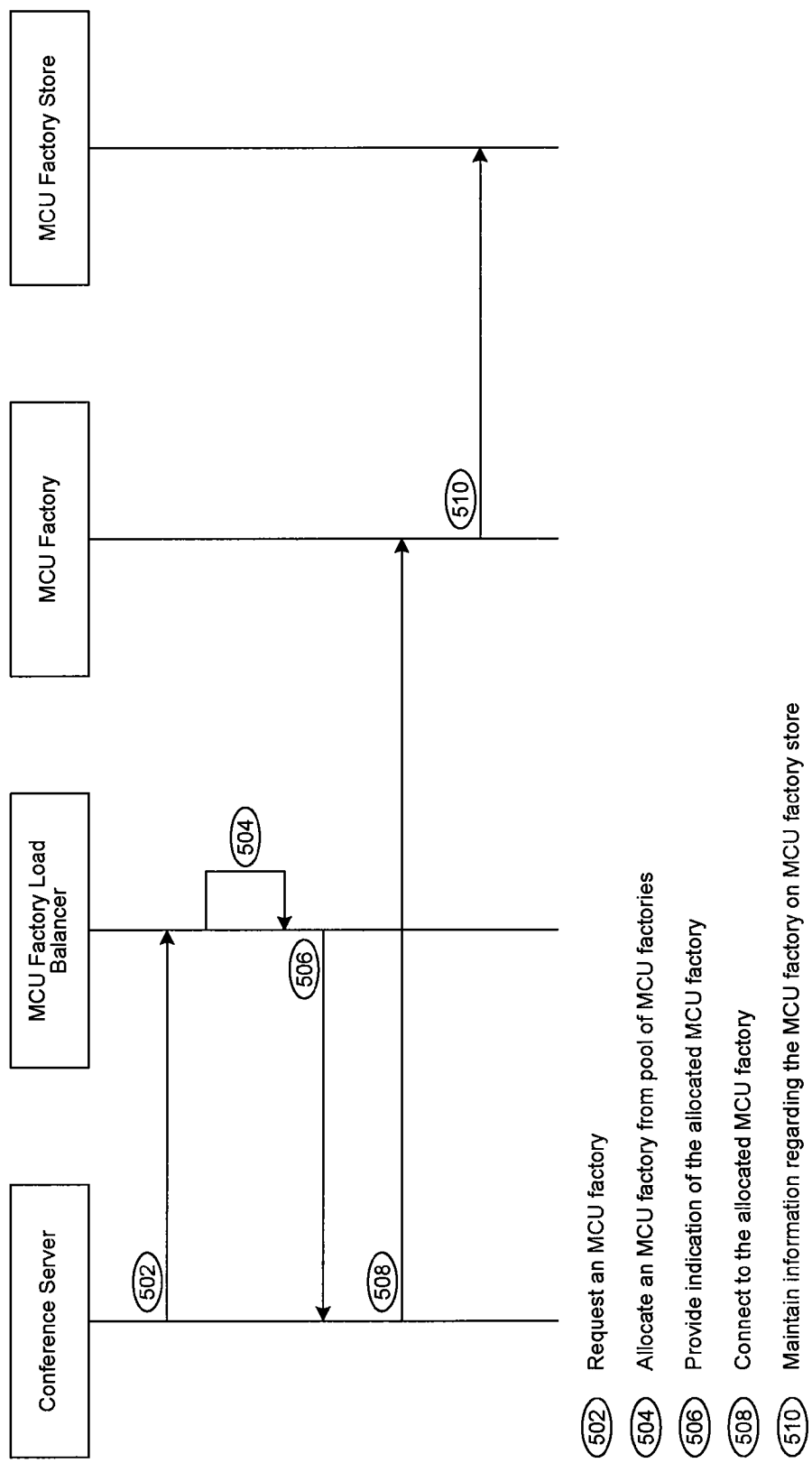
FIG. 5 is a data flow diagram that illustrates the flow of data to obtain an MCU factory for a conference, according to some embodiments.

FIG. 5 is a data flow diagram that illustrates the flow of data to obtain an MCU factory for a conference, according to some embodiments. Upon starting a conference, the conference server may request 502 an MCU factory to support the conference from the MCU factory pool. For example, the conference server may send a request for an MCU factory to the MCU factory load balancer. Upon receiving the request, the MCU factory load balancer determines 504 which MCU factory is best suited to service the conference and allocates that MCU factory to the conference server in order to service the conference. In some embodiments, the MCU factory load balancer allocates the MCU factory that has the most capacity available. One skilled in the art will appreciate that many different load balancing techniques may be used to allocate the MCU factories in the MCU factory pool. The MCU factory load balancer then provides 506 an indication of the allocated MCU factory to the conference server. The conference server then connects 508 to the allocated MCU factory. The conference server may maintain information regarding the allocation of the MCU factory to service the conference on the shared conference store. The allocated MCU factory maintains 510 information regarding the allocated MCU factory on the MCU factory store. For example, the MCU factory maintains information such as the number of conferences that are being serviced (hosted) by the MCU factory, the status of the MCUs assigned to the MCU factory, the availability (load) of the MCUs assigned to the MCU factory, etc. In some embodiments, the conference server may request a specific type of MCU factory from the MCU factory pool. For example, the conference server pool may include MCU factories of various types (e.g., an audio MCU factory that manages audio MCUs, a video MCU factory that manages video MCUs, etc.), and the conference server may request the specific type of MCU factory to service a conference as needed.

Figure 6:
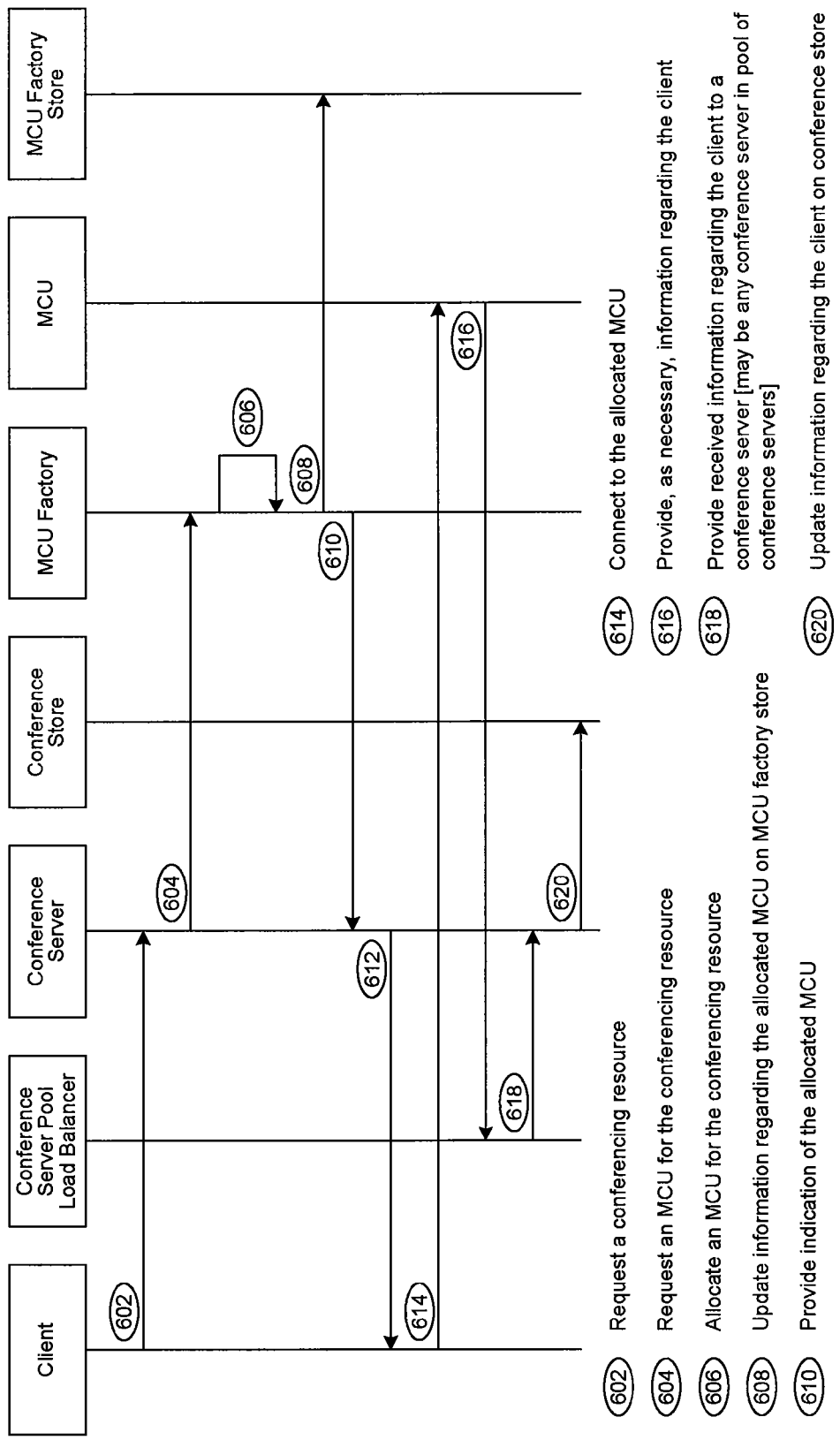
FIG. 6 is a data flow diagram that illustrates the flow of data to obtain an MCU for a conference, according to some embodiments.

FIG. 6 is a data flow diagram that illustrates the flow of data to obtain an MCU for a conference, according to some embodiments. A user participating in a conference may request a specific conferencing resource, such as application sharing, and the client may send a request 602 for the specific conferencing resource to the connected conference server (i.e., the conference server that the client is presently connected to in order to participate in the conference). Upon receiving the request, the conference server sends a request 604 for an MCU that is capable of providing the requested conferencing resource to the MCU factory that is allocated to service the conference. The MCU factory then determines 606 which MCU that is capable of providing the requested conferencing resource is best suited to service the conference, and allocates that MCU to the conference server in order to provide the conferencing resource (e.g., application sharing) to the conference. In some embodiments, the MCU factory allocates the MCU that has the most capacity available. In some embodiments, the MCU factory may allocate multiple MCUs that are capable of providing the requested conferencing resource. In this instance, the multiple MCUs may collaborate with each other (e.g., determine which MCU is better suited to provide the conferencing resource at any given point in time) to provide the requested conferencing resource, and a client may connect to any of the multiple MCUs to receive the conferencing resource. The MCU factory updates 608 the information regarding the allocated MCU on the MCU factory store. For example, the MCU factory may update information regarding the allocation of the MCU to the conference server, the additional load assigned to the MCU, etc. The MCU factory then provides 610 an indication of the allocated MCU to the conference server. Upon receiving the indication, the conference server provides 612 an indication of the allocated MCU to the client, and directs the client to connect to the indicated MCU. The conference server may maintain information regarding the allocation of the MCU to service the conference by providing the requested conferencing resource on the shared conference store. The client then connects 614 to the allocated MCU. The allocated MCU then provides 616, as necessary while servicing the conference, information regarding the client to the conference server pool load balancer. For example, the allocated MCU may provide information regarding the states of the clients that are connected to the MCU. For example, in the case of an audio MCU, the conference state information regarding the client may indicate that the client is now "muted." Similarly, in the case of an application sharing MCU, the conference state information regarding the client may indicate that the client is now "presenting." The conference server pool load balancer then provides 618 the information regarding the client received from the MCU to a conference server for maintaining in the shared conference store. Upon receiving the information, the conference server updates 620 the information regarding the client on the shared conference store. By sending the information for maintaining on the shared conference store to the conference server pool, the MCU is able to communicate conference state changes to the connected conference clients for maintaining on the shared conference store as long as at least one conference server is available in the conference server pool.

In some embodiments, upon determining a need to update conference state information for a connected client, the MCU can send a request for a conference server to the conference server pool load balancer. In response, the conference server pool load balancer can allocate a conference server, and provide an indication of the allocated conference server to the MCU. The MCU can then send the conference state information for the client to the conference server, and the conference server can update the information regarding the client on the shared conference store.

Figure 7:
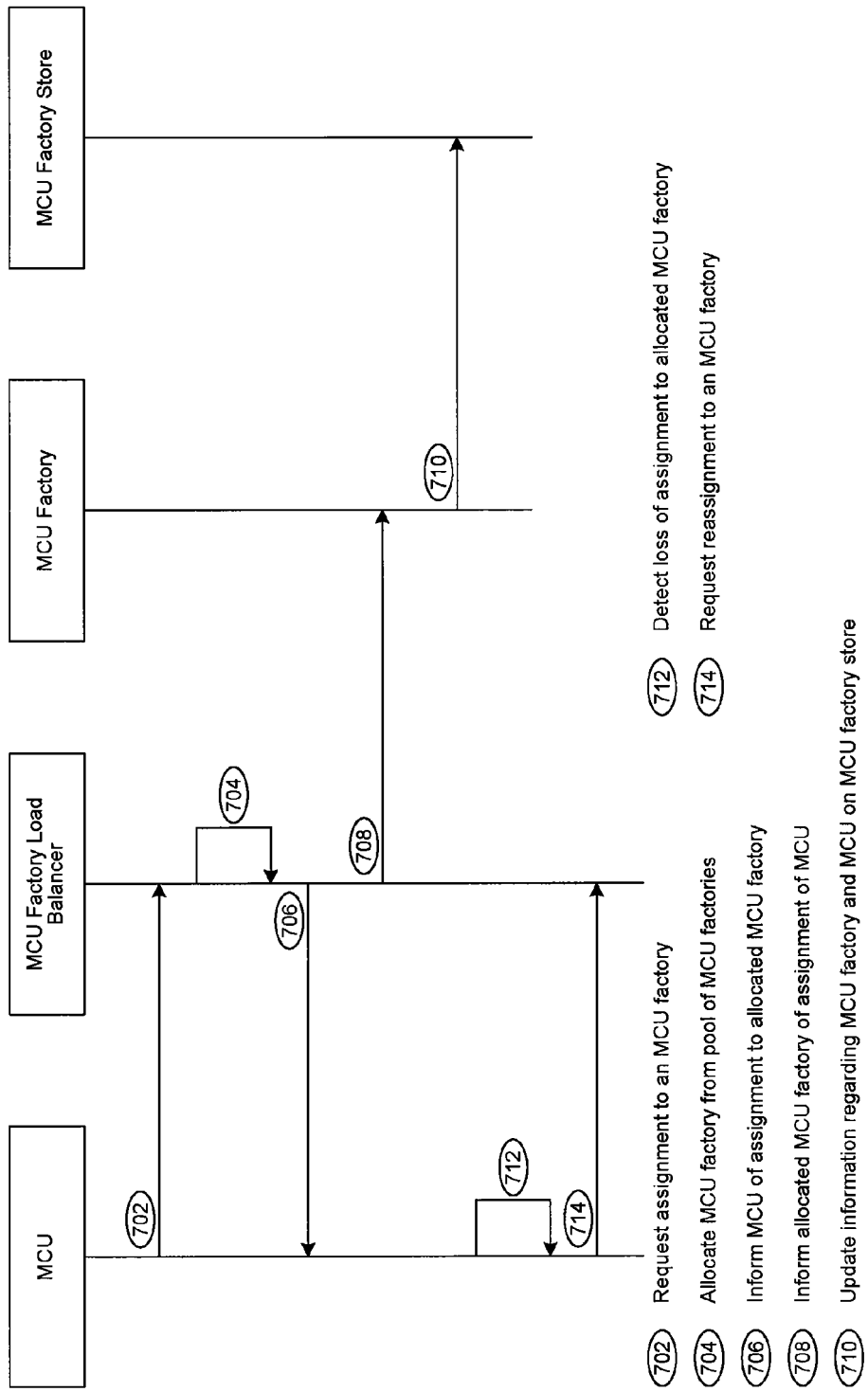
FIG. 7 is a data flow diagram that illustrates the flow of data to assign an MCU to an MCU factory, according to some embodiments.

FIG. 7 is a data flow diagram that illustrates the flow of data to assign an MCU to an MCU factory, according to some embodiments. By way of example, when starting to execute, an MCU can send a request 702 to be assigned to an MCU factory to the MCU factory load balancer. Upon receiving the request, the MCU factory load balancer determines 704 which MCU factory the MCU should be assigned to, and allocates an MCU factory for the MCU. In some embodiments, the MCU factory load balancer allocates the MCU factory that has the most capacity available to manage the MCU. One skilled in the art will appreciate that many different load balancing techniques may be used to allocate the MCU factories in the MCU factory pool. For example, the MCU factory load balancer may allocate an MCU factory that may need the type of shared conference resource provided by the MCU. The MCU factory load balancer then provides 706 an indication of the allocated MCU factory to the MCU. The MCU factory load balancer also provides 708 an indication of the assignment of the MCU to the allocated MCU factory. The allocated MCU factory updates 710 the information regarding the MCU factory and the MCU on the MCU factory store. For example, the allocated MCU may maintain information such as the assignment of the MCU to the allocated MCU factory on the MCU factory store. In some embodiments, the MCU may periodically send status update messages that indicate, for example, the status of the MCU to the allocated MCU factory to which it is assigned. Subsequently, the MCU may detect 712 a loss of the assignment to the allocated MCU factory. For example, the MCU factory may have encountered an error and stopped executing and the MCU may determine that the assignment to the MCU factory is lost because of a failure to receive a response to a status update message from the MCU factory. Upon detecting the loss of the assignment to the allocated MCU factory, the MCU can send a request 714 to be assigned to another MCU factory to the MCU factory load balancer. The MCU factory load balancer can then assign the MCU to another MCU factory in the MCU factory pool. In some embodiments, an MCU may not know which MCU factory it is assigned to. For example, the MCU factory load balancer may seamlessly represent the MCU factories in the MCU factory pool as a single virtual entity to the MCUs.

Figure 8:
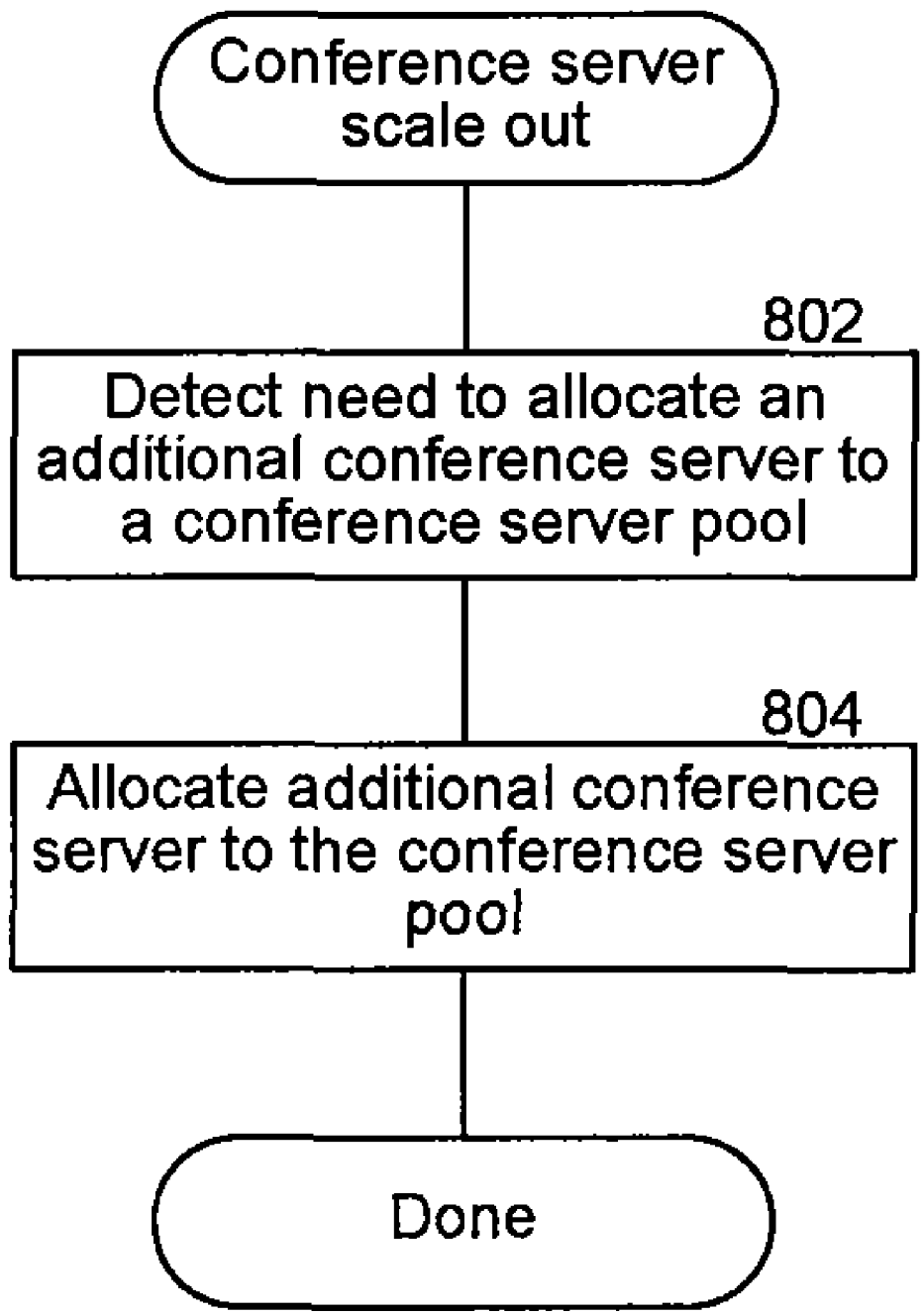
FIG. 8 is a flow diagram that illustrates the processing of a component of the conference system to scale out a conference server, according to some embodiments.

FIG. 8 is a flow diagram that illustrates the processing of a component of the conference system to scale out a conference server, according to some embodiments. By way of example, the component of the conference system may be monitoring the processing load placed on the conference servers in the conference server pool. In block 802, the component may detect a need to allocate an additional conference server to the conference server pool. For example, the component may determine that the processing load on conference servers in the conference server pool exceed a predetermined threshold that indicates the need for an additional conference server to be included in the conference server pool. In block 804, the component allocates the additional conference server to the conference server pool. The component then completes. For example, the conference system may maintain a pool of reserve conference servers that may be allocated to the conference server pool as necessary to provide the predetermined level of processing capability. Because the conference servers are stateless and all of the conference state information is maintained on the shared conference store, additional conference servers can easily be included in the conference server pool. Although not described, a similar approach can be utilized to scale out the MCUs and/or MCU factories.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, although the conference server pool has been described as containing a conference server pool load balancer that receives and initially processes the request made to the conference server pool, the conference system may provide another component in the conference server pool that receives and initially processes the requests made to the conference server pool. In a similar manner, the conference system may provide another component in the MCU factory pool that receives and initially processes the requests made to the MCU factory pool. Accordingly, the invention is not limited except as by the appended claims.

We claim:

1. A computer-implemented method for providing highly available conferencing services, the method comprising:
providing a conference server pool comprising a plurality of stateless conference servers, a conference server pool load balancer, and a remote conference store wherein the remote conference store is remote to each of the plurality of conference servers in the conference server pool and maintains conference state information for each of a plurality of conferences indicating a multipoint control unit factory that is assigned to each conference by a multipoint control unit load balancer and indicating clients that are currently participating in each conference such that the stateless conference servers share the conference state information maintained by the remote conference store;
receiving, at the conference server pool load balancer from a first client, a first request to join a conference;
selecting, by the conference server pool load balancer, a first conference server of the plurality of stateless conference servers to allocate to service the first join request based on a current workload of each of the stateless conference servers;
joining, by the first conference server, the first client to the conference based upon conference state information for the conference maintained on a remote conference store;
during the conference, updating, by the first conference server, the conference state information for the conference maintained on the remote conference store to indicate that the first client has joined the conference;
receiving, at the conference server pool load balancer from the first client, a second request to join the conference, the second request being a request to rejoin the conference after the first client lost connection with the conference;
selecting, by the conference server pool load balancer, a second conference server of the plurality of stateless conference servers to allocate to service the second join request based on the current workload of each of the stateless conference servers, the second conference server being different from the first conference server;
rejoining, by the second conference server, the first client to the conference based upon conference state information for the conference maintained on the remote conference store, the conference state information including an indication that the first client has rejoined the conference.

2. The method of claim 1, including updating by the second conference server the conference state information for the conference maintained on the remote conference store information regarding the first client.

3. The method of claim 1 further comprising:
sending from the first conference server to a pool of multipoint control unit factories a request for a multipoint control unit factory;
receiving at the first conference server an indication of a multipoint control unit factory allocated to the first conference server; and
connecting by the first conference server to the indicated multipoint control unit factory.

4. The method of claim 3, wherein the request for a multipoint control unit factory is received by a multipoint control unit factory load balancer.

5. The method of claim 3, wherein each multipoint control unit factory in the pool of multipoint control unit factories maintains information regarding multipoint control units assigned to the multipoint control unit in a remote multipoint control unit factory store.

6. The method of claim 3 further comprising:
receiving at the first conference server from the first client a request for a conferencing resource for the conference;
sending from the first conference server to the connected multipoint control unit factory a request for a multipoint control unit capable of providing the conferencing resource for the conference;
receiving at the first conference server from the connected multipoint control unit factory an indication of a multipoint control unit capable of providing the conferencing resource and which is allocated for the conference; and
providing by the first conference server to the first client the indication of the allocated multipoint control unit capable of providing the conferencing resource for the conference,
such that the client connects to the indicated multipoint control unit capable of providing the conferencing resource.

7. The method of claim 6, wherein the allocated multipoint control unit provides information regarding the conference and the first client for maintaining on the remote conference store.

8. The method of claim 7, wherein the information is provided to a conference server pool load balancer, and further wherein the conference server pool load balancer provides the received information to a conference server in the pool of conference servers for maintaining on the remote conference store.

9. A computer-implemented method for providing highly available multipoint control units, the method comprising:
providing a multipoint control unit factory pool comprising a plurality of multipoint control unit factories, a plurality of multipoint control units, a multipoint control unit factory load balancer, and a remote multipoint control unit factory store;
receiving, at the multipoint control unit factory pool from a multipoint control unit, a request to be assigned to a multipoint control unit factory in the multipoint control unit factory pool;
allocating, by the multipoint control unit factory pool, a multipoint control unit factory for the multipoint control unit;
assigning, by the multipoint control unit factory pool, the multipoint control unit to the allocated multipoint control unit factory;
under control of the allocated multipoint control unit,
maintaining information regarding the assigned multipoint control unit in the remote multipoint control unit factory store;
monitoring health status of the assigned multipoint control unit; and
storing health status information in the remote multipoint control unit factory store; and
under control of the multipoint control unit factory load balancer,
receiving, from a conference server, a request for a multipoint control unit factory to support a conference hosted by the conference server,
selecting a multipoint control unit factory based on a current workload of the multipoint control unit factories and health status of the multipoint control units as indicated by information of the remote multipoint control unit factory store; and sending, to the conference server, an indication of the selected multipoint control unit factory so that the conference server can direct its clients to connect to the selected multipoint control unit factory.

10. The method of claim 9 further comprising:
receiving at the allocated multipoint control unit factory from the conference server a request for a multipoint control unit capable of providing a conferencing resource;
allocating by the allocated multipoint control unit factory one of its multipoint control units capable of providing the conferencing resource to the conference server; and
providing by the allocated multipoint control unit factory to the conference server an indication of the allocated multipoint control unit factory capable of providing the conferencing resource, such that the conference server connects to the indicated multipoint control unit.

11. A conferencing system for providing highly available conferencing services, comprising:
a conference store that maintains conference state information for each of a plurality of conferences, the conference state information indicating a multipoint control unit factory that is assigned to each conference by a multipoint control unit load balancer and indicating clients that are currently participating in each conference
a pool of stateless conference servers, each conference server in the pool being remote to the conference store, each conference server in the pool maintaining its conference state information on the conference store; and
a conference server pool load balancer that load balances the conference servers in the pool by selecting a first conference server for servicing a first request to join a conference and selecting a second conference server for servicing a second request to join the conference.

12. The system of claim 11, wherein the conference server pool load balancer, in response to detecting a need for an additional conference server to be added to the pool of conference servers, allocates an additional conference server to the pool of conference servers.

13. The system of claim 11 further comprising:
a multipoint control unit factory store for maintaining information regarding multipoint control units;
a pool of multipoint control unit factories, each multipoint control unit factory in the pool being remote to the multipoint control unit factory store, each multipoint control unit factory in the pool maintaining information regarding its assigned multipoint control units on the multipoint control unit factory store; and
a multipoint control unit factory load balancer for load balancing the multipoint control units in the pool.

* * * * *